(12) United States Patent
Liu et al.

(10) Patent No.: US 12,530,703 B2
(45) Date of Patent: Jan. 20, 2026

(54) DELIVERY OF DATA-DRIVEN AND CROSS-PLATFORM EXPERIENCES BASED ON BEHAVIORAL COHORTS AND IDENTITY RESOLUTION

(71) Applicant: Amplitude, Inc., San Francisco, CA (US)

(72) Inventors: Curtis Liu, San Francisco, CA (US); Nirmal Utwani, San Francisco, CA (US); Tanner McGrath, San Francisco, CA (US)

(73) Assignee: Amplitude, Inc., San Francisco, CA (US)

( * ) Notice: Subject to any disclaimer, the term of this patent is extended or adjusted under 35 U.S.C. 154(b) by 556 days.

(21) Appl. No.: 17/710,586

(22) Filed: Mar. 31, 2022

(65) Prior Publication Data

US 2022/0318830 A1   Oct. 6, 2022

Related U.S. Application Data

(60) Provisional application No. 63/168,906, filed on Mar. 31, 2021.

(51) Int. Cl.
*G06Q 30/0204* (2023.01)
(52) U.S. Cl.
CPC ............... *G06Q 30/0204* (2013.01)
(58) Field of Classification Search
CPC .............................................. G06Q 30/0204
See application file for complete search history.

(56) References Cited

U.S. PATENT DOCUMENTS

| 7,809,601 | B2 | 10/2010 | Shaya et al. |
| 8,775,338 | B2 | 7/2014 | Lee |
| 8,779,266 | B2 | 7/2014 | Basso et al. |
| 8,782,162 | B1 | 7/2014 | Deshpande et al. |
| 8,812,960 | B1 | 8/2014 | Sun et al. |
| 10,699,203 | B1 | 6/2020 | Ozcaglar et al. |
| 11,115,421 | B2 | 9/2021 | Nevatia et al. |

(Continued)

FOREIGN PATENT DOCUMENTS

WO   WO-2021050740 A1   3/2021

OTHER PUBLICATIONS

Aerendir, "How to Track Unique Users with Behavioural Analytics Tools," available at https://io.serendipityhq.com/experience/behavioural-analytics-tracking-unique-users/, Nov. 17, 2018.

(Continued)

*Primary Examiner* — Deirdre D Hatcher
(74) *Attorney, Agent, or Firm* — IP Spring

(57) ABSTRACT

Systems and methods for delivering data-driven experiences of a product are described herein. In some embodiments, a server receives user data associated with a plurality of users using the product. The server identifies, from the plurality of users, a first user belonging to a first cohort based on at least one of user behaviors and user properties associated with the first user included in the user data. The server causes an experience of the product to be delivered to the first user. The server then detects that the first user has switched from a first device to a second device. The server further causes the experience to continue to be delivered to the first user.

20 Claims, 8 Drawing Sheets

(56) References Cited

U.S. PATENT DOCUMENTS

| | | |
|---|---|---|
| 2003/0182281 A1 | 9/2003 | Wittkowski |
| 2005/0256844 A1 | 11/2005 | Cristol |
| 2005/0278731 A1 | 12/2005 | Cameron et al. |
| 2006/0089812 A1 | 4/2006 | Jacquez |
| 2006/0122807 A1 | 6/2006 | Wittkowski |
| 2007/0156809 A1 | 7/2007 | Dickinson et al. |
| 2007/0192170 A1 | 8/2007 | Cristol |
| 2007/0208545 A1 | 9/2007 | Wittkowski |
| 2008/0183454 A1 | 7/2008 | Barabasi et al. |
| 2008/0234976 A1 | 9/2008 | Wittkowski |
| 2009/0254399 A1 | 10/2009 | Cristol |
| 2010/0161709 A1 | 6/2010 | Fourman |
| 2010/0179930 A1 | 7/2010 | Teller et al. |
| 2010/0274661 A1* | 10/2010 | Aaltonen ............ G06Q 30/0267 705/14.42 |
| 2010/0312884 A1 | 12/2010 | Nandy et al. |
| 2011/0137950 A1 | 6/2011 | Deng et al. |
| 2011/0179020 A1 | 7/2011 | Ozzie et al. |
| 2011/0225142 A1 | 9/2011 | McDonald |
| 2014/0337474 A1 | 11/2014 | Khuti et al. |
| 2014/0358825 A1 | 12/2014 | Phillipps et al. |
| 2014/0379811 A1* | 12/2014 | Chan ..................... H04W 8/24 709/205 |
| 2015/0006079 A1 | 1/2015 | Leblanc |
| 2015/0332308 A1 | 11/2015 | Liu |
| 2016/0027037 A1 | 1/2016 | Cai et al. |
| 2016/0105472 A1* | 4/2016 | Chitroda ............ H04L 65/4038 709/204 |
| 2016/0155143 A1 | 6/2016 | Hsiao et al. |
| 2016/0173540 A1* | 6/2016 | Linden ................. H04L 67/535 709/228 |
| 2016/0173617 A1 | 6/2016 | Allinson |
| 2016/0189202 A1 | 6/2016 | Wang et al. |
| 2016/0321308 A1 | 11/2016 | Brinnand |
| 2017/0076299 A1 | 3/2017 | Modarresi |
| 2017/0116525 A1 | 4/2017 | Pinel et al. |
| 2017/0206552 A1 | 7/2017 | Rajkumar et al. |
| 2017/0220953 A1 | 8/2017 | Byron et al. |
| 2017/0223036 A1 | 8/2017 | Muddu et al. |
| 2017/0235848 A1 | 8/2017 | Van Dusen et al. |
| 2018/0210808 A1 | 7/2018 | Shanmugam et al. |
| 2018/0225709 A1* | 8/2018 | Ferber ................... G06N 20/00 |
| 2019/0163829 A1 | 5/2019 | Puri et al. |
| 2019/0244348 A1 | 8/2019 | Buckler et al. |
| 2019/0260742 A1 | 8/2019 | Arora et al. |
| 2019/0325315 A1 | 10/2019 | Ioffe |
| 2020/0251213 A1 | 8/2020 | Tran et al. |
| 2020/0412726 A1 | 12/2020 | Nevatia et al. |
| 2021/0035010 A1 | 2/2021 | Kramer et al. |
| 2021/0110294 A1 | 4/2021 | Elewitz et al. |
| 2022/0058429 A1 | 2/2022 | Zou et al. |
| 2022/0286474 A1 | 9/2022 | Kuppa et al. |

OTHER PUBLICATIONS

International Search Report and Written Opinion for International Patent Application No. PCT/US2020/041996, dated Sep. 29, 2020 (7 pages).

International Search Report and Written Opinion for International Patent Application No. PCT/US2020/066456, dated Mar. 18, 2021 (16 pages).

International Search Report and Written Opinion for International Patent Application No. PCT/US2022/021993, dated Mar. 25, 2022 (10 pages).

Jayaram, "Mixpanel System Architecture," available at https://mixpanel.com/wp-content/uploads/2018/06/System-architecture_June2018.pdf, Jun. 2018.

Wong, "Nova: The Architecture for Understanding User Behavior," available at https://amplitude.com/blog/nova-architecture-understanding-user-behavior, May 25, 2016.

Wong, "Scaling Analytics at Amplitude," available at https://amplitude.com/blog/scaling-analytics-at-amplitude, Aug. 25, 2015.

Zhang, Shuai et al. "Deep Learning based Recommender System: A Survey and New Perspectives," ACM Comput. Surv. 1, 1, Article 1, Jul. 2018 (35 pages).

International Search Report and Written Opinion for International Patent Application No. PCT/US2022/022858, dated Sep. 13, 2022 (15 pages).

Anonymous, "Composite Key," Wikipedia, retrieved from https://en.wikipedia.org on Dec. 10, 2023, 2 pages.

Carasso, "Exploring Splunk—Search Processing Language (SPL) Primer and Cookbook," 2012.

* cited by examiner

| User ID | Device ID | Internal ID | Experience | Side Effect | Comment |
|---|---|---|---|---|---|
| U1 | D1 | 1 | A | U1 -> 1; D1 -> 1 | New user, new device |
| U1 | null | 1 | A | None | Known user |
| null | D1 | 1 | A | None | Known device |
| U2 | D2 | 2 | B | U2 -> 2; D2 -> 2 | New user, new device |
| U2 | D1 | 2 | B | None | Known user. User takes precedence |

Figure 5

US 12,530,703 B2

DELIVERY OF DATA-DRIVEN AND CROSS-PLATFORM EXPERIENCES BASED ON BEHAVIORAL COHORTS AND IDENTITY RESOLUTION

CROSS-REFERENCE TO RELATED APPLICATIONS

This patent application claims the benefit of and priority to U.S. Provisional Patent Application No. 63/168,906, filed on Mar. 31, 2021, the disclosure of which is hereby incorporated by reference in its entirety for all purposes.

FIELD OF THE DISCLOSURE

This disclosure relates to a method and system for delivering consistent data-driven and cross-platform experiences based on behavior cohorts and identity resolution.

BACKGROUND

As technology, market landscape, and customer needs are increasingly changing, product (e.g., websites, client-server applications, or other software) delivery methods have evolved. For example, agile product management methodologies have been used to create roadmaps and deliver software. However, the challenge remains as to how new software (e.g., experiment solutions, feature flagging solutions) can be consistently delivered within required quality standards, committed budgets, and timelines. An experiment solution is designed to test small changes on an application, while a feature flagging solution is used to gradually release new features to users.

Many existing systems do not have access to end users' behavioral data and thus lack the ability to identify users who exhibit particular behaviors. This can cause experiment variants to be delivered to incorrect users (e.g., some important users may be excluded from using the experiment variants) and render the subsequent experience analysis inaccurate and ineffective. Also, while existing systems may monitor and track some data related to software/application development lifecycle, these systems usually cannot access and use analytics data to estimate how many end users will be impacted when product experiences are targeted to a group of users, determine impacts on key product metrics, etc. In general, existing systems merely evaluate small incremental software improvements in a short time horizon. Further, existing systems rely on a single user identifier to determine the experience (e.g., an experiment variant or a new feature). When a user switches to a new device or a new platform, existing systems switch the experience for the user rather than providing a consistent experience across platforms. Moreover, the existing systems have limited analytics capabilities. For example, some existing systems only track data at release milestones rather than performing continuous delivery tracking.

SUMMARY

To address the aforementioned shortcomings, a method and a system for delivering consistent data-driven and cross-platform experiences based on behavior cohorts and identity resolution is provided. In some embodiments, the method includes receiving user data associated with a plurality of users using the product; identifying, from the plurality of users, a first user belonging to a first cohort based on at least one of user behaviors and user properties associated with the first user included in the user data; causing an experience of the product to be delivered to the first user; detecting that the first user has switched from a first device to a second device; and causing the experience to continue to be delivered to the first user.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 5 depicts a table illustrating determination of a unique internal ID, according to some embodiments.

DETAILED DESCRIPTION

Figure 1:
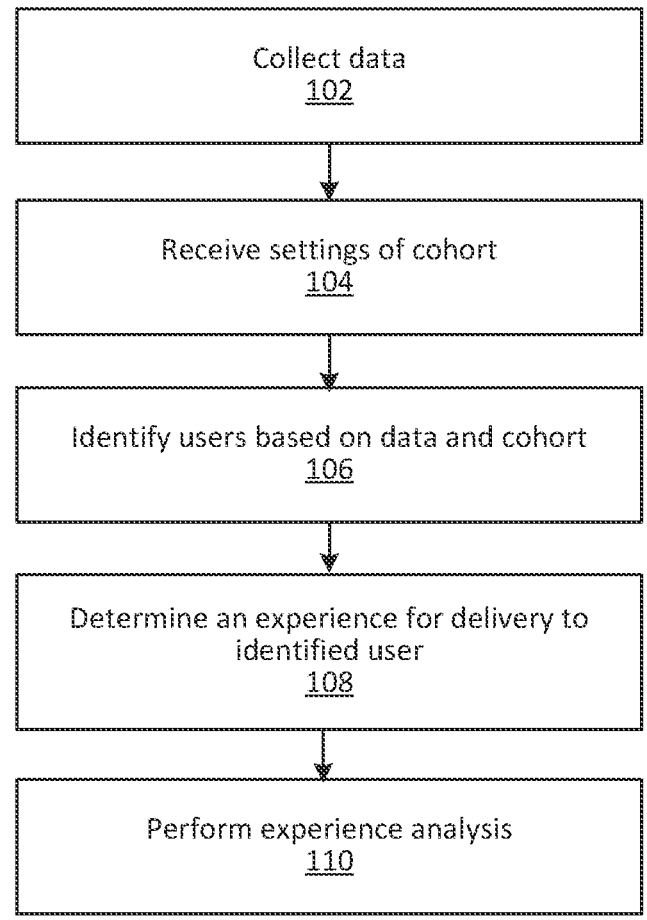
FIG. 1 is an example overview of a method for delivering consistent data-driven and cross-platform experiences based on behavior cohorts and identity resolution, according to some embodiments.

The disclosed embodiments have advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure relates to a system and method for delivering consistent data-driven experiences powered by a layer of behavioral data and a robust cross-platform/device identity resolution mechanism. The present disclosure also supports the integrated software development kit (SDK) use and allows automatic tracking of users' exposure to the experience to improve experiment analysis.

In the design of computer-rendered products (e.g., websites, client-server applications, or other software), the marketers and developers of the websites or applications often have a vision of an optimal usage of the websites or applications. The optimal level of usage often centers around performance of particular actions on the website or application. These actions may include completing a registration or other transaction, performing a purchase, upgrading an account, logging in a certain number of times during a week, contributing content at a specified level, or using other features of the website or application.

However, it is often difficult to deliver an experiment or release a new feature (i.e., an experience) of a product in a manner that reliably increases end-user engagement (e.g., by increasing the likelihood of users performing specific tasks of the product). Ideally, the experience including most prominent features that would most greatly increase the likelihood of user engagement should be defined, or the algorithms should be tuned to cause specified features to be delivered to particular users in a particular order or with a particular emphasis, so that user engagement can be maximized. As companies become more sophisticated with product design, the way that users access a website or application, the number of users using the website or application, the actions that users may perform on the website or application, or other metrics associated with users and/or user actions also become more complex. With such complexities, limited abilities on data ingestion, tracking, and analysis of existing systems would not be sufficient to solve the technically difficult and error-prone problems, including identifying target users based on user-behavior cohorts, automatically tracking user exposure to variable experiences, providing consistent experience across platforms and across devices, etc.

Figure 2:
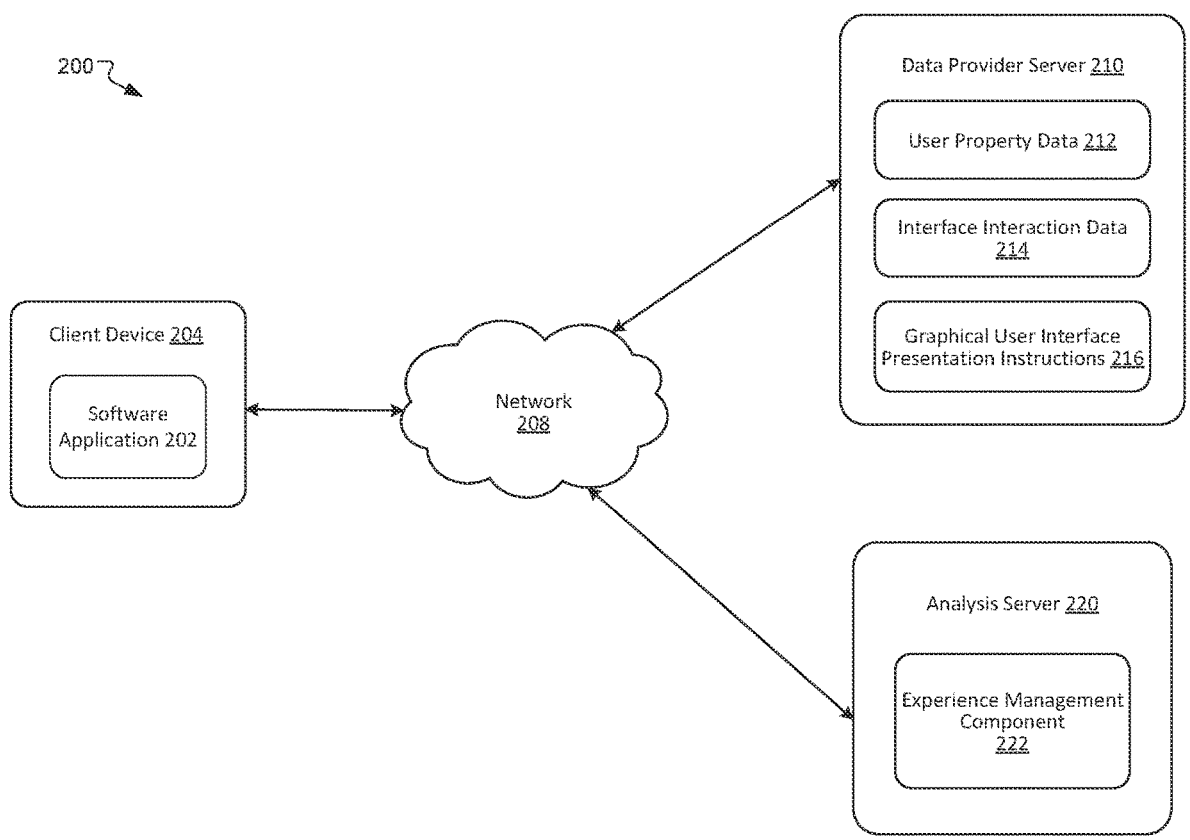
FIG. 2 depicts an example client-server system structure, according to some embodiments.

The present disclosure proposes a technical solution to address the aforementioned problems. FIG. 1 is an overview of a process 100 for delivering consistent data-driven and cross-platform experiences based on behavior cohorts and identity resolution. In some embodiments, process 100 is operated in a client-server framework (e.g., as depicted in FIG. 2), where one or more servers in communication with a client software application residing on one or more client devices perform steps 102-110. A client is a customer (e.g., a company) that delivers an experience of a product to end-users. The experience, for instance, includes experiment variants and new features of websites or applications. An end-user (or simply referred to as "user") interacts with the product via web-based or other types of applications and interfaces. Server(s) ingests and analyzes the experience-related data, e.g., user-interaction data and provides management service or tools that help the client/customer optimize the experience implementation through the functioning of process 100. An example client-server framework will be described below with reference to FIG. 2.

At step 102, data associated with a client/customer is collected. In some embodiments, the data includes user data about user actions and user properties. The data of user actions may be user behavioral data (e.g., log in, subscribe, search) collected from webpage interactions, mobile application interactions, user interface interactions. The data of user properties may include user demographic information (e.g., geographical location, user interests), user identifier(s), user devices (e.g., device type, operating system type), etc. User interest data may be derived from user action data, e.g., from the searches performed during a particular time window. The duration of the time window can range from a few minutes to a few days. User interest data may also be obtained from cookies stored on the user device and or pixels embedded in the webpage or application.

Once the user data is collected, the present disclosure allows the data to be automatically transformed and processed. Often, the amount of data received based on interaction tracking may be too large to be feasible to use. For example, searching through many terabytes of data to identify a user that performed a specific action on a website may be computationally prohibitive. Even the required hardware (e.g., the level of storage) may be impractical. The received data may also be in an unstructured streaming fashion, and thus is not consumable by many analytics systems (e.g., machine learning systems) that expect data to be aggregated, cleaned, and structured. The present disclosure provides an efficient approach to automatically process the large volume of data.

At step 104, cohort settings are received from the client/customer. In some embodiments, the present system provides a software application (e.g., web application) for the customer to define a user experience and its variants. A set rules to target individual end-users and cohorts of users, where such cohorts may be based on the collected user data, can also be defined. A user experience is typically a feature. For example, searching for and displaying alternate routes when a user-selected route is congested, is a feature or an experience. Likewise, recommending do-it-yourself (DIY) videos or instructions and/or professional services, when a webpage displaying home-repair tools is visited, is another feature/experience.

A variant of an experience modifies and/or adds to the rendering of the experience on the user device. For example, the alternatives to a congested route may be selected and displayed based on user preference. For example, avoiding toll roads is one variant and or preferring toll roads is another. According to yet another set of variants the amount and/or types of additional information (e.g., nearby gas stations, restaurants, etc.) that may be displayed, may be based on the display size, etc. Likewise, one variant may show more DIY videos, or order DIY videos before professional services recommendations, based on past user behavior, while another variant may do the opposite, also based on the past user behavior.

Once the one or more experiences, and optionally, variants of an experience, are defined and enabled, the present system allows the customer to use one of the SDKs (e.g., Java, Android, Javascript client, Javascript server) or a representational state transfer (REST) application programming interface (API) to determine the experience and a variant of the experience in particular, in some cases, to be rendered to each targeted user in real-time, as detailed below.

At step 106, one or more sets of users are identified based on the collected data and cohort settings. For example, the data is segmented at least by cohort and used to identify the users. In some embodiments, a set of users exhibiting certain behavioral patterns (e.g., belonging to a certain cohort) and having certain user properties (e.g., belonging to a specific demographic group) may be identified, such that the customer can run experiments and release new features to this identified set of users.

At step 108, an experience, i.e., a new feature of a website or application, and optionally a particular variant of the experience, is determined for delivery to the identified users. In some embodiments, the present system provides a customer with insights on how many end users will be impacted when the customer launches a new experience for a certain percentage of the total user base. Such insights may affect the decision making about which experience variant should be delivered to which set of users.

Responsive to the delivery of experience, an experience analysis is initiated and performed at step 110. In some embodiments, once the end-users start interacting with the new experience, the enrollment of a user into the experience is automatically instrumented into an analytics process, where the enrollment data can be analyzed to determine and quantify user engagement with a rendered experience. In some cases, the analysis may be used to determine which variant of the experience is performing better than the other variants of that experience. Based on the analysis, the present system allows customers to determine if the new experience (and/or a particular variant thereof) resulted in a statistically significant improvement over an existing experience. In some embodiments, the present system tracks users' exposure to each experience variant. This tracking mechanism may help the customer quickly make changes to the experiment implementation. In some embodiments, the present system also supports seamless integration on client-side SDKs, which enables real-time user property monitoring and automatically tracks exposure events when an experience is served to a user. Examples of exposure events include time spent of a rendered page, number and/or types links clicked with the rendered page, frequency of vising the page, portions of the page where the user spent relatively more time compared to the time spent at other portions of that webpage. These times can be determined by they time of mouse hovering, or by the portions actually displayed on a small-size display, such as that of a smart phone.

The present system further provides robust identity resolution, which, along with the integrated SDKs, allows the experience provided to users to remain consistent when the users switch between platforms and devices. Process 100 will be detailed below with reference to FIGS. 2-7.

System Overview

FIG. 2 is a client-server system structure 200, according to some embodiments. System 200 is a self-serve experience delivery platform that enables customers to deliver consistent data-driven experiences by targeting users with specific properties and users that exhibit certain behavioral patterns. By way of example and not limitation, the methods described herein (e.g., process 100 in FIG. 1) may be executed, at least in part, by a software application 202 running on client device 204 in communication with a data provider server 210 and an analysis server 220 via a network 208. By way of example and not limitation, client device 204 can be a smartphone device, a tablet, a tablet personal computer (PC), a laptop PC, or a desktop computer. In some embodiments, client device 204 can be any suitable electronic device connected to network 208 via a wired or wireless connection and capable of running software applications like software application 202. In some embodiments, software application 202 can be installed on client device 204 or be a web-based application running on client device 204. Software application 202 may additionally be configured to display a graphical user interface to interact with at least one of data provider server 210 and analysis server 220.

In some embodiments, client device 204 may be operated by a customer. By way of example and not limitation, the customer may be a member (e.g., marketers and developers) of a company or other entities who designs a product (e.g., websites and/or applications), a member of the company who delivers an experience of a product (e.g., experiment variant and/or new features), an authority figure who reviews and makes decisions about the experience delivery, or other users who are working remotely and have access to software application 202 via client device 204.

Network 208 may be an intranet network, an extranet network, a public network, or combinations thereof used by software application 202 to exchange information with one or more remote or local servers (e.g., data provider server 210 and analysis server 220), or used for the communications between the data provider server 210 and analysis server 220. Examples of network 208 include, without limitation, a cellular network, a local area networks (LAN), a wide area networks (WAN), an Ethernet, the Internet, a terrestrial, satellite or wireless links, or a combination thereof. According to some embodiments, software application 202 may be configured to exchange information, via network 208, with additional servers that belong to system 200 or other systems similar to system 200 not shown in FIG. 2 for simplicity.

Data provider server 210 and analysis server 220 may be implemented using server-class computers or other computers having one or more processor cores, co-processors, or other computers. These servers may be physical server computers and/or a virtual server instances stored in a data center, such as through cloud computing. While a single server computer is shown for each of data provider server 210 and analysis server 220, embodiments may comprise any number of computing devices. For example, data provider server 210 may be configured to communicate with a plurality of different analysis servers, each of which performs a portion of functionalities as described in this disclosure. As another example, analysis server 220 may comprise a plurality of server computers performing computations in parallel, such as a first server computer for ingesting data and a second server computer for analyzing the data.

Data provider server 210 provides a graphical user interface to client device 204 through graphical user interface presentation instructions 216 and software application 202. The graphical user interface may comprise one or more web pages, one or more applications, and/or any interface which can be displayed on client device 204 and with which client device 204 can interface. The graphical user interface presentation instructions 216 comprise a set of instructions which, when executed, causes display of the graphical user interface on the client device 204.

The graphical user interface presentation instructions 216, when executed, may further cause data provider server 210 to respond to one or more actions performed by client devices 204 through the graphical user interface. The response may include navigating to a different page of the graphical user interface, altering display of the current page of the graphical user interface, and/or storing data identifying the performed actions.

Data provider server 210 collects user data about user actions and user properties. In some embodiments, data provider server 210 tracks interface interaction data 214, i.e., data describing actions performed through the graphical user interface, such as scrolling, selecting, typing, viewing, etc. To this end, the data provider server may be in electronic communication via network 208 and/or another network with several user devices (end-user devices) that are not shown. In other embodiments, data provider server 210 also identifies and tracks user property data 212 such as name, gender, personal preferences, postal code, and/or any other attributes given by client device 204 and/or tracked by data provider server 210. For example, the other attributes may include property data of client device 204 such as the type of the device, the type of the operating system installed on the device, the location of the device, assess time of the device by a user, etc.

In some embodiments, data provider server 210 may transmit user property data 212 and interface interaction data 214 as event strings to a storage or to analysis server 220. The storage may be a separate storage device, such as cloud storage provided by a third-party provider or a storage device of analysis server 220. For example, data provider server 210 may combine user property data 212 and interface interaction data 214 into event strings, and send the combined event data to analysis server 220 through one or more APIs provided by analysis server 220. In other embodiments, the user property data 212 and/or interface interaction data 214 may be transmitted in a different format to analysis server 220.

While FIG. 2 depicts the same device storing the interaction data 214 and the graphical user interface presentation instructions 216, in some embodiments, the tracking and storage of interaction data are performed by a separate device and/or entity for providing the graphical user interface. For example, a third-party customer data platform may track user actions through the graphical user interface and send the tracking data to analysis server 220.

Analysis server 220 accesses raw event strings from a storage, ingests the raw data, and processes the data in an experience management component 222. Experience management component 222 comprises instructions for performing a series of data transformations in order to deliver the right experiment variant and new features to right end-users at a right time. While experience management component 222 may include various components (as shown in FIGS. 3 and 4), each of these components comprises computer readable instructions which, when executed by one or more processors, performs certain functionality.

Computer executable instructions described herein may be in machine executable code in the instruction set of a CPU and may have been compiled based upon source code written in JAVA, C, C++, OBJECTIVE-C, Python, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the system of FIG. 2 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by analysis server 220 and/or data provider server 210.

Experience Management Component

Figure 3:
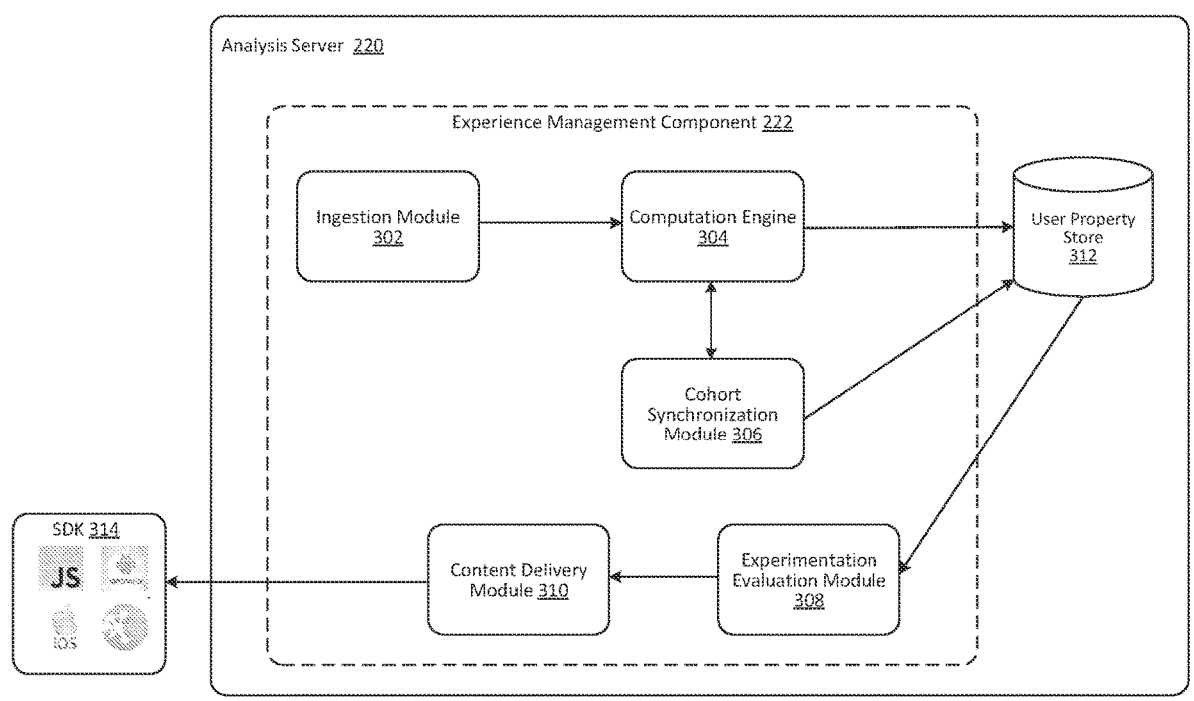
FIG. 3 depicts example components of an experience management component of an analysis server, according to some embodiments.
Figure 4:
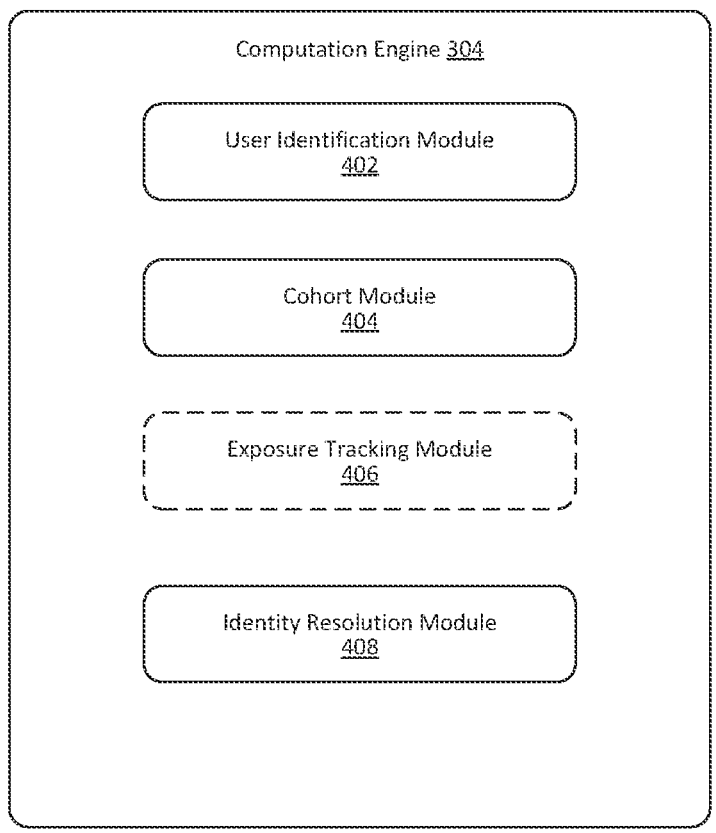
FIG. 4 depicts example components of a computation engine of an experience management component, according to some embodiments.

In the illustrated embodiment of FIG. 3, experience management component 222 of analysis server 220 includes an ingestion module 302, a computation engine 304, a cohort synchronization module 306, an experimentation evaluation module 308, and a content delivery module 310. These components, in communication with a user property store 312, ingest and analyze the received data to deliver an identified experience (e.g., experiment variants or new features) to identified users via SDK 314. In some embodiments, SDK 314 may be Java, Android, Javascript client, Javascript server, etc.

In some embodiments, between one or more of the modules/engines of FIG. 3, data is persisted into memory. For example, ingested data may be persistent to memory by ingestion module 302, then used to perform analysis (e.g., identity resolution) by computation engine 304. The identity resolved data may then be persisted to memory, replacing the ingested data stored by ingestion module 302. By persisting data to memory between modules/engines, the process of FIG. 3 allows for definition of a component that scales to several workers, i.e., processing units. For example, one worker may perform the ingestion of data while a different worker performs the identity resolution of previously ingested data. This parallelization of processing allows analysis server 220 to perform the data ingestion and analysis faster and more efficiently, thereby providing content delivery closer to real-time than various known techniques.

Ingestion module 302 receives and ingests the data (e.g., event data) from data provider server 210 to generate analytic data for further analysis. In some embodiments, ingestion module 302 may decompress the event data and separate it back into several event records. The generated event records may include known attribute or property data for a specific user and one or more actions performed by the user. For example, an event record may identify a user with a login or anonymous identifier, may include stored data regarding the user, and may include the actions of selecting a first page on an interface, performing a search, selecting an item on the interface, and watching a video. Ingestion module 302 may also extract, from the event records, identifiers, features, and/or a separate JavaScript Objection Notation (JSON) string for use by other modules/engines. For example, ingestion module 302 may parse the JSON string into a Plain Old Java Object (POJO), which can be used by computation engine 304 to easily determine individual properties, traits, and other information.

Once the data has been ingested, it is available to be queried by computation engine 304 to determine to which end-users an experience of a product or a particular variant should be delivered. An experience may be an experiment variant or new features of a product (e.g., a website or an application) from a customer (e.g., a company). The customer seeks to explore the experiment management component for control over the experiments/releases. A common theme is to use feature flags to rollout a feature to a small percentage of users, or quickly roll back a feature if it is not working properly or as expected. The control further includes limiting the visibility of experiments or new features to individual users or a group of users. Computation engine 304 identifies specific users that may help ensure the best experience for all end-users. In some embodiments, computation engine 304 also communicates with experimentation evaluation module 308 to determine an experiment variant for a specific group of users. Computation engine 304 may track a user's exposure to an experiment variant and determine whether and how to make changes to experiment implementation. Computation engine 304 may further perform identity resolution to ensure that the consistent experience can be delivered to end-users across platforms and across devices.

Referring to FIG. 4, in some embodiments, computation engine 304 includes a user identification module 402, a cohort module 404, an exposure tracking module 406, and an identity resolution module 408. User identification module 402 is configured to segment users and target specific users for an experience based on a set of rules. In some embodiments, user identification module 402 in connection with other components of analysis server 220 and/or data provider server 210 generates and presents a graphical user interface to a customer, in which the customer may define an experience of a product, list variants of the experience, and set rules to target specific users for the experience and/or experience variants.

These rules can be the building blocks for optimizing user targeting. In some embodiments, an experiment will execute when the rules are met. For example, if user identification module 402 associates a particular webpage (e.g., offering a discount) with users in a particular geographic region, this discount will only be visible when a visitor from this particular region is detected. User identification module 402 may specify rules based on user properties (e.g., geographic location, membership) and user behaviors (e.g., frequency of a user action). However, this rule-making may become very complex when a large amount of user properties and/or behaviors need to be considered. Also, it is difficult to migrate a complex rule or a portion of that rule from one experiment to another. The two experiments can be two difference experiences or they can be two different variants of the same experience. In other words, managing user targeting rules at scale is challenging, especially when the number or type of properties, behaviors and/or other data used for rule-making continues to grow. To address this challenge and improve the rule-making efficiency, in some embodiments, user identification module 402 communicates with cohort module 404 to perform cohort-based user targeting.

Cohort module 404 creates one or more user cohorts such that users may be segmented by cohort, and users having similar properties and/or similar behavior patterns may be identified based on one or more rules. A cohort is a group of users who share a trait or set of traits. A cohort may be a behavioral cohort that is determined by user actions taken within a specific time period. For example, a behavioral cohort may include users who watch three consecutive episodes of a TV show on the first day after signing up for a video streaming service, users who enable push notifications during onboarding, or Android® users who abandoned their carts on a particular e-commerce site in the last month. In the context of delivering variable experiences of a product, user identification module 402 and cohort module 404 may use behavioral cohorts to group together different end-users based on user interactions, i.e., the events that the users have actuated in one or more products, e.g., while visiting one or more webpages or while using one or more apps. By targeting users who had engaged in the product(s) in a certain way, the experiments and new features can be safely and accurately tested and validated before a complete launch. In some embodiments, cohort module 404 in connection with other components of analysis server 220 and/or data provider server 210 generates and presents a graphical user interface for a customer (e.g., a company) to create one or more cohort for end-users using the customer's product.

A behavior cohort is usually created based on the performed events, i.e., the interactions with a product that users have performed. In some embodiments, cohort module 404 uses at least one of event properties and user properties to create a behavior cohort. An event describes a user action and/or behavior. The event properties associated with user behaviors include, but are not limited to, count, relative count, total sum of property, distinct values of property, and historical count of the performed events. The user properties may include geographical location, user identifier, user name, user device, access time, user loyalty membership, etc.

A count is the number of times that a user event/interaction has fired. Suppose a product is a music streaming platform, cohort module 404 may create a behavior cohort to include all the users who fired "Favorite Song or Video" of a media product more than five times during the last 30 days.

A relative count indicates the difference in event frequencies. Cohort module 404 may create a behavior cohort based on comparing frequencies of different events. For example, a behavior cohort may be the users who fired "Play Song or Video" at a greater frequency than "Favorite Song or Video" during the last 30 days.

With a total sum of property, cohort module 404 filters for users who fired events with a particular event sum and/or a particular user property sum. These event or user properties must have numerical values. For example, if the event is "Play Song" and the property is duration, a cohort may include the users who fired "Play Song" more than five times in the last 30 days, with a total duration greater than 60 seconds.

Cohort module 404 may also use distinct values of property to group users, that is, identifying users based on one or more threshold values of event or user properties. For example, a behavior cohort may include users who favorited a song or video on more than one device.

Further, cohort module 404 may use a historical count to determine a cohort of users who performed an event a specific number of times (e.g., 1-5 times). With the historical count, cohort module 404 can capture each N-th instance of a user action. This is important because the number of instances of user action (e.g., one in-app purchase versus two purchases) may greatly affect the user's retention and conversion rate with respect to a product. Cohort module 404 uses the historical count to easily pinpoint and resolve areas of friction for first-time users to boost the overall targeting performance. Also, the historical count can highlight the usage differences between users such that the best user(s) in view of the number of critical actions can be identified by cohort module 404 and user identification module 402.

Cohort module 404 specifies time conditions for event properties including count, relative count, total sum of property, distinct values of property, and historical count. In some embodiments, cohort module 404 allows events of a certain property to be collected during a specific date range, subsequent to a specific date, within a specific interval of first use, etc. For example, a group of users who fired a specific event within a specific amount of days of becoming a new user may be identified.

Once a behavioral cohort is created, cohort module 404 adds the cohort to one or more charts. A chart includes cohorts, events, event properties, and/or other event/user data for advanced analysis. In some embodiments, cohort module 404 allows a customer to create an inline behavioral cohort in the context of a specific chart without having to navigate away from the chart. Cohort module 404 can use inline cohorts to measure populations of cohorts over time. For example, a highly engaged inline behavioral cohort may be created to track an important milestone of a product, e.g., identifying users who are playing five or more songs, each of which is longer than three minutes, in a single day. In this context, a cohort or an inline cohort may not be a group of actual users having certain defined traits, but the collection of such traits.

In some embodiments, cohort module 404 stores the created cohorts in user property store 312 such that user identification module 402 may choose one or more cohorts from the stored segments to identify users having specific behaviors. Usually, user property store 312 stores latest property values of user properties such as users' geographical location, user identifier, user name, user device data, access time, etc., in a database. An exemplary database may include a DynamoDB, which is partitioned by users for quick lookup. In some embodiments, a user property that causes a user to belong to a cohort (i.e., a group of users in this context) is considered as a unique and complex user property, e.g., a cohort-membership property, for storage in user property store 312. In some embodiments, user identification module 402 identifies users for receiving an experience or a particular variant thereof (e.g., experiment involving new feature) of a product based on both general user properties and cohort-membership property (e.g., cohorts). For example, user identification module 402 may identify users of specific behaviors (e.g., from cohort settings) and specific geographical location for experience delivery.

While cohorts share some similarity with general properties, cohort-based user targeting is different. Cohorts' definitions are built from custom analytics queries, for example, querying users who joined the membership in the last 30 days, never play a song, and have more than 100 friends, etc. Therefore, cohorts are much more adaptable and complex than usual properties. More importantly, cohorts are user-independent and re-useable. Thus, a cohort defined for one experience/variant(s) can be analyzed and used by the same customer for another experience/variant(s) in the future, or a cohort defined for one experience/variant(s) and one customer can be shared and used by another customer in another experience/variant(s).

Exposure tracking module 406 tracks a user's exposure to an experience variant. Proper exposure tracking helps drive accurate results in experiment environment by correctly communicating which users should be included in experiment evaluation analysis. While exposure tracking module 406 (e.g., in dashed lines) is depicted as a part of computation engine 304, it may also reside on experimentation evaluation module 308.

Usually, an initial exposure tracking of an experiment relies upon an assignment event that sets user properties essential to experiment analysis. These user properties may also be used by default to create a new experiment. However, the assignment event is often not an accurate representation of exposure, since a user may be assigned but never actually encounter the variable experience in the application. Such an incorrect representation of exposure may lead to over-exposure and cause incorrect experiment results. Moreover, a customer-defined exposure event may sometimes be configured prior to the assignment event, resulting in a race between the custom exposure event and the assignment event. This race may cause a user to be wrongfully counted as unassigned and/or unexposed, which leads to sample ratio mismatch (SRM), incorrect analysis, as well as general data mistrust.

Exposure tracking module 406 solves these problems by setting user properties when the exposure event gets ingested instead of relying on the assignment event to set these properties. In some embodiments, exposure tracking module 406 allows a customer to use a convenient and well-defined exposure event to remove the possibility of misattribution and race conditions to ensure experiment analysis accuracy and exposure reliability. A customer may simply send an "Sexposure" event (e.g., via a graphical user interface) to track a user's exposure to an experiment variant without directly manipulating user properties. When an "Sexposure" event is ingested, exposure tracking module 406 may automatically set or unset the requisite user properties. In some embodiments, if the customer enables an integrated SDK support, exposure tracking module 406 detects it and automatically sends out the "Sexposure" event for the customer.

The performance of experiment analysis depends on accurately tracking unique users. However, users often log in and out at will, browse anonymously, or use multiple devices, multiples browsers on the same device or across different devices, or a combination of apps and browsers on the same or different devices, which makes it very difficult to accurately count unique users. This problem may also cause the provision of consistent user experiences to the same user across multiple devices and multiple platforms to be impractical. Identity resolution module 408 performs identity resolution. To ensure an accurate count of unique users, identity resolution module 408 employs a solution using three identifiers (IDs), i.e., device IDs (which may include browser and/or app IDs), user IDs, and internal IDs. In some embodiments, identity resolution module 408 assigns a unique internal ID to each user. Identity resolution module 408 determines this unique internal ID by a combination of a user ID and a device ID. This unique ID, designed to be consistent for a user as the user switches between different devices and platforms, can ensure a consistent user experience to be delivered to the same user across multiple devices and/or multiple platforms.

FIG. 5 depicts a table 500 illustrating the determination of a unique internal ID. Assume the customer is launching a new experience, and two possible experience variants are A and B. Identity resolution module 408 may determine internal IDs with a three-step procedure. At step 1, if a user ID is known and has a mapping to an internal ID, identity resolution module 408 identifies and returns the mapped Internal ID. For example, as shown in row 502 of table 500, the user ID is "U1," the device ID is unknown as reflected by "null," and U1 is mapped to an internal ID "1." Identity resolution module 408 recognizes this internal ID "1" without assigning a new internal ID, as reflected by "none" in the "side effect" field. If, however, there is no mapped internal ID, identity resolution module 408 moves to step 2.

At step 2, if a device ID is known and has a mapping to an internal ID, identity resolution module 408 checks if the mapped internal ID has a user ID associated with it. If there is no user ID associated with the internal ID, identity resolution module 408 uses the internal ID and returns. For example, as shown in row 504 of table 500, the device ID is "D1," the user ID is unknown as reflected by "null," and D1 is mapped to the internal ID "1." Identity resolution module 408 recognizes this internal ID "1" without assigning a new internal ID, as reflected by "none" in the "side effect" field. If, however, there is a user ID having been associated with the internal ID, identity resolution module 408 discards this internal ID and moves to step 3. At step 3, identity resolution module 408 creates a new internal ID and returns it. In other words, if the IDs have been configured as shown in row 506 of table 500, identity resolution module 408 will create a new internal ID (e.g., "3"), to a user with user ID "U3" when user U3 is also accessing the product from the device with device ID "D1." Also, if a user with a same user ID accesses the product from a different device, as indicated by "D2 and D1" in rows 508 and 510, the user ID takes precedence. This means that identity resolution module 408 recognizes the same user from different devices and uses the user ID (not device ID) to generate a same internal ID. In other scenarios, identity resolution module 408 identifies the user ID or the device ID for a user and generates an internal ID for the user based on either the user ID or the device ID.

Further, as shown in table 500, a consistent user experience is provided to the same user, represented by a unique internal ID, across multiple devices and multiple platforms. For example, experience A is provided to internal ID "1," and experience B is provided to internal ID "2."

The process of user targeting and identity resolution is a dynamic process. Referring back to FIG. 3, a cohort synchronization module 306 is used to capture the changes of cohorts to ensure the validity and accuracy of user targeting. In some embodiments, cohort synchronization module 306 refreshes and synchronizes the cohorts between computation engine 304 and user property store 312. A cohort is often added as a segment to one or more charts. The charts shape the analysis used by user identification module 402 and other modules (e.g., experimentation evaluation module 308). For a chart or query that segments on a cohort, in some embodiments, cohort synchronization module 305 can automatically recompute the segmented cohort whenever the chart is generated. Further, cohort synchronization module 306 allows a customer to export, import, and synchronize the cohorts between different subsystems, e.g., using a simple one-click operation in a graphical user interface.

Responsive to a specific group of users being identified, experimentation evaluation module 308 may determine which variant of an experience (e.g., including experiment and/or new features) should be delivered to the identified users. In some embodiments, experimentation evaluation module 308 uses the cohort membership property retrieved from user property store 312 to determine the correct variant for the experience. The analysis related to cohort membership property is usually based on various charts, with which experimentation evaluation module 308 may measure the top events performed by the users with a product over a selected time period, analyze how often a specific event is fired, determine the count of unique users firing events in the product, clarify which users tend to fire certain events, etc. Based on the analysis, experimentation evaluation module 308 determines an appropriate experiment or new feature to be delivered to a group of users or cohort of users having specific behaviors and/or specific user properties.

In some embodiments, after user targeting rules and new experience have been determined, experimentation evaluation module 308 may estimate how many users will be targeted by the new experience using historical analytics obtained from chart analysis. For example, experimentation evaluation module 308 may determine a total number of users assigned to the new experience during a time period (e.g., per week), a percentage or a number of users assigned to a particular experience variant, etc. Experimentation evaluation module 308 may be accessed by a customer via an SDK (e.g., iOS, Android, Javascript client, Javascript server) or directly by querying a REST API.

Once targeted users and an experience (e.g., an experiment or release a new feature (i.e., S) of a product are determined, content delivery module 310 is activated to deliver the experience to the targeted users. In particular, content delivery module 310 is configured to deliver a consistent experience to the users across platforms and across devices. Identity resolution is one mechanism to handle the problem of missing user ID or out-of-sync device ID that causes deteriorated experience implementation. Another mechanism to make experience implementation easier and less error-prone is a seamless client-side SDK integration between experiment SDKs and analytics SDKs. This integration may help alleviate at least three technical problems faced during onboarding and implementation. First, the SDK integration may reduce the initialization complexity, especially the complexity related to ordering and timing the initialization of analytics SDKs and experiment SDKs. Second, the SDK integration allows real-time user property targeting, whereas, previously, user properties identified in the analytics SDKs cannot be targeted in real-time when fetching variants for a user due to race conditions. Third, the SDK integration enables the accurate tracking of a user's exposure to an experience variant from the client-side.

A common case when implementing an experiment is to (1) set the user properties for experiment targeting using the analytics SDK and (2) fetch updated variants for a user. However, since there is a delay between sending the identified event and successfully ingesting the user property, the system encounters a race condition between (1) and (2). To solve this issue, integrated SDKs automatically and in real-time propagate user properties set (or unset) from analytics to experiment to be used in the next variant fetch request. When serving an experience variant to a user, content delivery module 310 employs the integrated SDKs to simplify initialization, enable real-time user properties, and automatically track exposure events.

Methods for Delivering an Experience of Product to Identified Users

Figure 6:
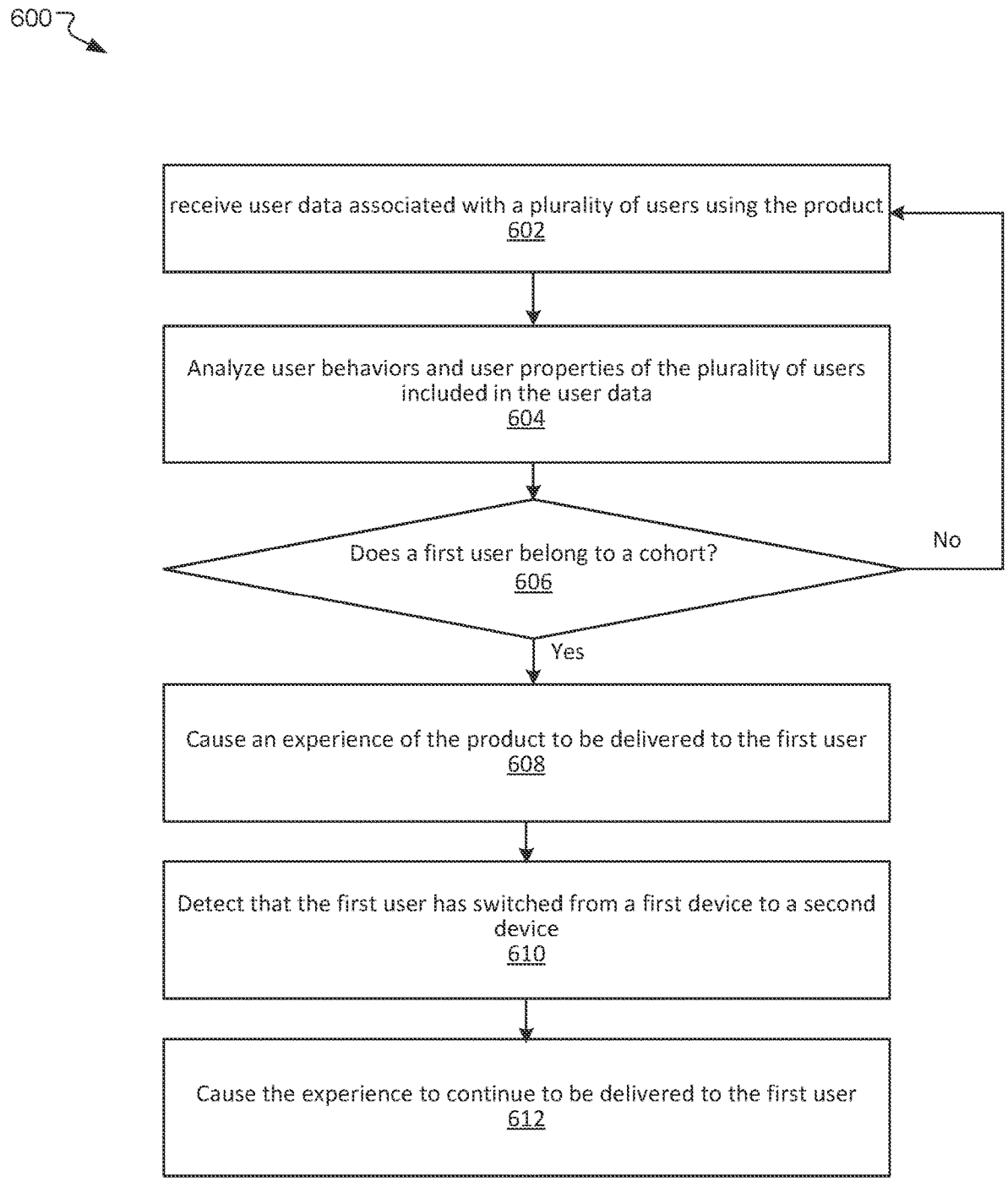
FIG. 6 is an example method for delivering data-driven experiences of a product, according to some embodiments.

FIG. 6 is an example method 600 for delivering data-driven experiences of a product, according to some embodiments. In some embodiments, method 600 is performed by experience management component 222 of analysis server 220 in communication with data provider server 210 and client device 204 as shown in FIG. 2. At step 602, experience management component 222 receives user data associated with a plurality of users using the product. The product may be websites or applications from a customer (e.g., a company). In some embodiments, data provider server 210 collects, from a client device associated with the customer, the user data of end-users accessing or using the product, and transmits the collected data to analysis server 220. Experience management component 222 of analysis server 220 ingests the received data and stores the ingested data in user property store 312.

At step 604, experience management component 222 analyzes user behaviors and user properties of the plurality of users included in the user data. The data of user behaviors describe user actions (e.g., log in, subscribe, search), which may be collected from webpage interactions, mobile application interactions, user interface interactions of the users with the product. The data of user properties include at least user demographic information (e.g., geographical location, user interests), user identifier(s), user devices (e.g., device type, operating system type), etc. In some embodiments, a user belonging to a cohort is considered to be a unique and complex user property, e.g., a cohort-membership property, and stored in user property store 312. A cohort may be a behavioral cohort that is determined by user actions taken within a specific time period.

At step 606, based on the analysis, experience management component 222 determines whether a first user of the plurality of users belongs to a cohort. In some embodiments, experience management component 222 builds a set of rules for targeting specific users for an experience of the product. The experience may include experiment variants and/or new features of the product. The rules may be based on cohorts and/or other user properties. The rules are also related to creating one or more cohorts. An experience will execute when the rules are met. For example, if a cohort rule is satisfied, the experience will be delivered to the users belonging to the cohort such as the users who watch three consecutive episodes of a TV show on the first day after signing up for a video streaming service.

If the first user is determined to belong to a cohort, i.e., a cohort rule is satisfied, at step 608, experience management component 222 causes the experience of the product to be delivered to the first user. In some embodiments, experience management component 222 determines the experience or experience variant for a specific cohort of users and signals the client device associated with the customer via a graphical user interface (e.g., of software application 202) to deliver the experience to the users (e.g., the first user) belonging to the specific cohort. However, if no targeting rules (e.g., a cohort rule) are satisfied, for example, the first user does not belong to a cohort, method 600 returns back to step 602 to further collect user behavior data and user property data.

At step 610, experience management component 222 detects that the first user has switched from a first device to a second device. Even if the first user is now accessing the product from a different device, at step 612, experience management component 222 further causes the experience to continue to be delivered to the first user. In some embodiments, experience management component 222 allows the customer to continue to deliver the same experience to the first user based at least in part on identity resolution. Experience management component 222 performs the identity resolution based on determining a unique internal identifier for the first user switching from the first device to the second device.

Figure 7:
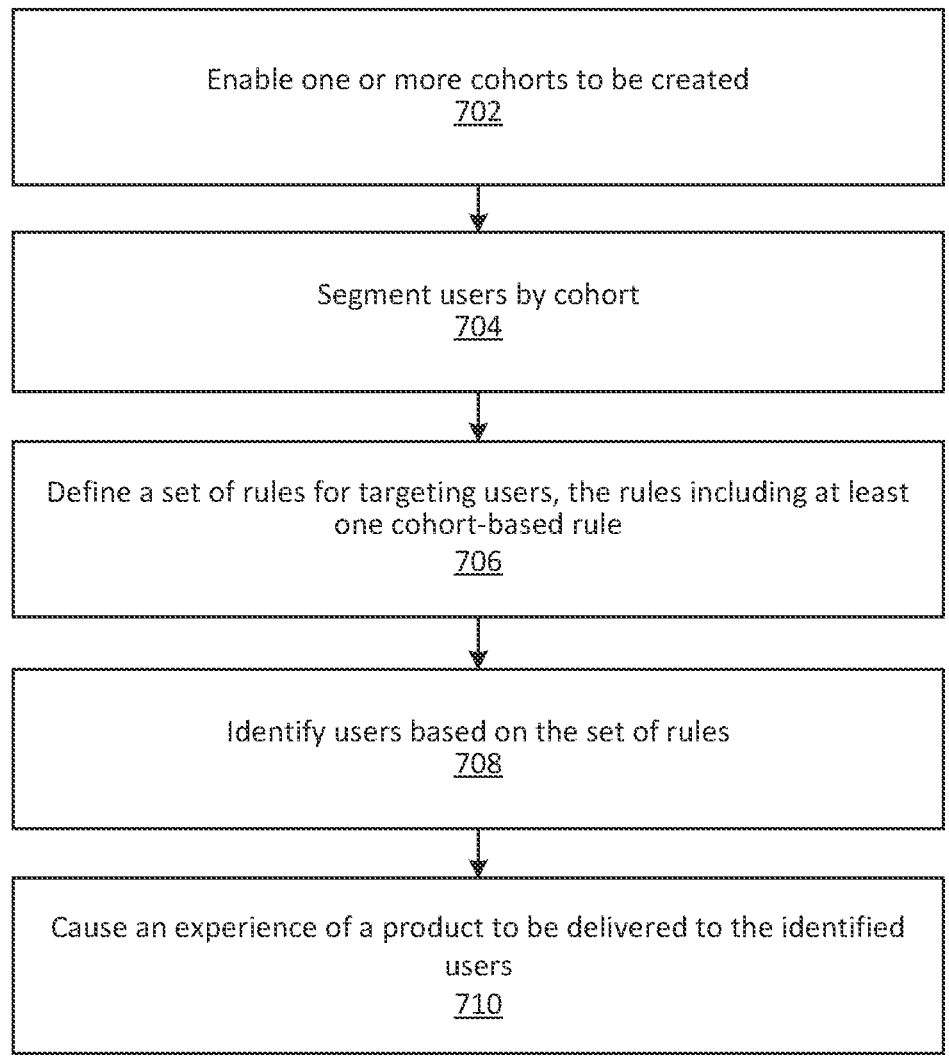
FIG. 7 is an example method for targeting users for delivering an experience of a product, according to some embodiments.

FIG. 7 is an example method 700 for targeting users for delivering an experience of a product, according to some embodiments. In some embodiments, method 700 is performed by experience management component 222 of analysis server 220 in communication with data provider server 210 and client device 204 as shown in FIG. 2.

At step 702, experience management component 222 enables one or more cohorts to be created. In some embodiments, experience management component 222 in connection with other components of analysis server 220 and/or data provider server 210 generates and presents a graphical user interface for a customer to create one or more cohorts for end-users using the customer's product. In some embodiments, experience management component 222 uses at least one of event properties and user properties to create a behavior cohort. An event describes a user action and/or behavior. The event properties associated with user behaviors include, but are not limited to, count, relative count, total sum of property, distinct values of property, and historical count of performed events, i.e., the interactions with a product that users have performed. The user properties may include geographical location, user identifier, user name, user device, access time, user loyalty membership, etc. By targeting users who had engaged in the product in a certain way, experience management component 222 can safely and accurately test and validate an experience including experiments and new features before a complete launch.

At step 704, responsive to receiving the settings or definition of the one or more cohorts, experience management component 222 segments users by cohort. Therefore, when ingesting the user data received from data provider server 210, experience management component 222 will automatically compute the count, relative count, total sum of property, distinct values of property, and historical count of the performed events, and separate users into groups or cohorts of users based on the computation.

At step 706, experience management component 222 defines a set of rules for targeting users, the rules including at least one cohort-based rule. In some embodiments, experience management component 222 defines the rules to identify a set of users exhibiting certain behavioral patterns (e.g., belonging to a certain cohort) and/or having certain user properties (e.g., belonging to a specific demographic group), such that the customer can run experiments and release new features to this identified set of users. For example, experience management component 222 may target users that have made at least a threshold number of purchases from a specific geographic area in a specific time period using a product (e.g., a web application) to receive a specific discount displayed on a web page through the web application. In this scenario, not only user behavior (e.g., purchases) but also user properties (e.g., a geographical location) are considered to target specific users.

Experience management component 222 identifies users based on the set of rules at step 708, and causes an experience of the product to be delivered to the identified users. For example, if a user made at least the threshold number of purchases in the specific time period using the web application, and the user came from the specific geographic area, then this user will receive the specific discount.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
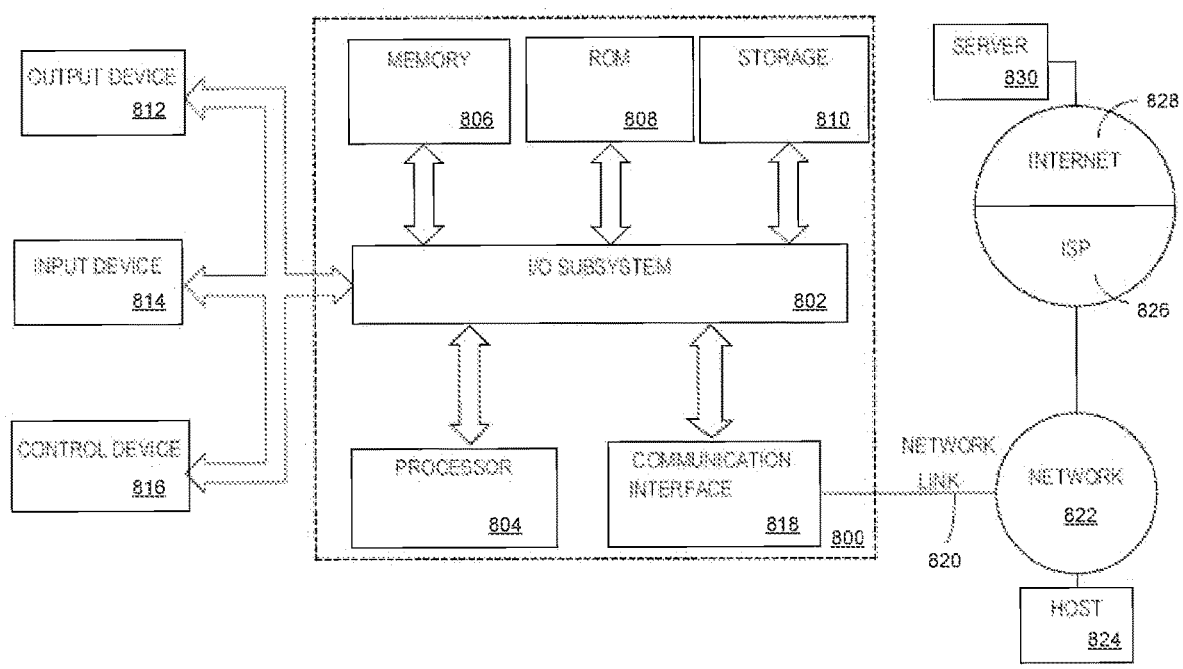
FIG. 8 is a block diagram that illustrates a computer system upon which an embodiment may be implemented.

For example, FIG. 8 is a block diagram that illustrates a computer system 800 upon which an embodiment may be implemented. Computer system 800 includes a bus 802 or other communication mechanisms for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions. In some embodiments, storage device 810 includes a user property store 312 in FIG. 3.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 (e.g., network 208 in FIG. 2) typically provides data communication through one or more networks to other data devices. For example, network link 820 may provide a connection through local network 822 to a host computer 824 (e.g., client device 204 in FIG. 2) or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 (e.g., data provider server 210 and analysis server 220 in FIG. 2) might transmit a requested code for an application program through Internet 828, ISP 826, local network 822 and communication interface 818.

The received code may be executed by processor 804 as it is received, and/or stored in storage device 810, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method to deliver data-driven experiences of a computer-rendered product, the method comprising:
   receiving user data associated with a plurality of users using the product, the product comprising at least one of a website or an application;
   identifying, from the plurality of users, a first user belonging to a first cohort based on at least one of user behaviors or user properties associated with the first user included in the user data;
   causing an experience of the product to be delivered to the first user via a graphical user interface on a first device;
   performing an identity resolution to determine that the first user has switched from the first device to a second device, wherein the identity resolution is performed by deriving a unique internal identifier for the first user based on a user ID and a device ID associated with the first user, the unique internal identifier being derived by:
      in response to the user ID being known and being mapped to a first internal identifier, choosing the unique internal identifier to be the first internal identifier;
      in response to the user ID being known and not being mapped to an internal identifier, but the device ID being known and being mapped to a second internal identifier, determining if the second internal identifier is associated with a user ID associated with a second user, and in response to the second internal identifier being determined to not be associated with a user ID associated with a second user, choosing the unique internal identifier to be the second internal identifier;
      in response to the second internal identifier being determined to be associated with the user ID associated with the second user, discarding the second internal identifier and creating a new internal ID as the unique internal identifier for the first user;
   wherein if the first user accesses different devices with different device IDs, the user ID takes precedence when deriving the unique internal identifier;
   wherein the unique internal identifier is derived so as to be consistent for the first user as the first user switches between different devices and platforms and ensures a consistent user experience to be delivered to the first user across multiple devices, multiple platforms, or a combination thereof; and
   causing the experience to be delivered to the firsts user via a graphical user interface on the second device, such that the first user continues to receive the experience after switching from the first device to the second device.

2. The computer-implemented method of claim 1, further comprising:
   creating one or more cohorts based on at least one of event properties or user properties; and
   segmenting the plurality of users based on at least one cohort of the one or more cohorts,
   wherein the at least one cohort includes the first cohort and a second cohort.

3. The computer-implemented method of claim 2, further comprising:
   determining an experience variant of the product to be delivered to users of the second cohort;
   identifying another user belonging to the second cohort based on at least one of user behaviors or user properties associated with the other user included in the user data; and
   causing the experience variant to be delivered to the other user.

4. The computer-implemented method of claim 2, wherein the event properties include at least one of a count, a relative count, a total sum of a property, distinct values of a property, or a historical count of user interactions with the product.

5. The computer-implemented method of claim 2, wherein the user properties include at least one user demographic data or user device data, wherein the user device data includes at least one of a type of a device, a type of an operating system installed on the device, or a location of the device.

6. The computer-implemented method of claim 1, further comprising estimating a number of users impacted by the experience based on an experiment evaluation analysis using historical analytics.

7. The computer-implemented method of claim 1, further comprising:
   causing the experience of the product to be delivered to a group of users of the plurality of users, the group of users including the first user;
   tracking an exposure of the group of users to the experience; and
   determining, from the group of users, users to be included in an experiment evaluation analysis based on the exposure tracking.

8. The computer-implemented method of claim 1, further comprising performing client-side software development kit (SDK) integration between experiment SDKs and analytics SDKs.

9. The computer-implemented method of claim 1, further comprising reusing the first cohort defined for the experience associated with a client in a different experience associated with a different client.

10. The computer-implemented method of claim 1, wherein the unique internal identifier links the first user to the user ID, a device ID for the first device, and a device ID for the second device.

11. A system to deliver data-driven experiences of a computer-rendered product comprising:
a memory with instructions stored thereon; and
a processing device, coupled to the memory, the processing device configured to access the memory and execute the instructions, wherein the instructions cause the processing device to perform operations, the operations comprising:
receiving user data associated with a plurality of users using a product, the product comprising at least one of a website or an application;
identifying, from the plurality of users, a first user belonging to a first cohort based on at least one of user behaviors or user properties associated with the first user included in the user data;
causing an experience of the product to be delivered to the first user via a graphical user interface on a first device;
performing an identity resolution to determine that the first user has switched from the first device to a second device, wherein the identity resolution is performed by deriving a unique internal identifier for the first user based on a user ID and a device ID associated with the first user, the unique internal identifier being derived by:
in response to the user ID being known and being mapped to a first internal identifier, choosing the unique internal identifier to be the first internal identifier;
in response to the user ID being known and not being mapped to an internal identifier, but the device ID being known and being mapped to a second internal identifier, determining if the second internal identifier is associated with a user ID associated with a second user, and in response to the second internal identifier being determined to not be associated with a user ID associated with a second user, choosing the unique internal identifier to be the second internal identifier;
in response to the second internal identifier being determined to be associated with the user ID associated with the second user, discarding the second internal identifier and creating a new internal ID as the unique internal identifier for the first user;
wherein if the first user accesses different devices with different device IDs, the user ID takes precedence when deriving the unique internal identifier;
wherein the unique internal identifier is derived so as to be consistent for the first user as the first user switches between different devices and platforms and ensures a consistent user experience to be delivered to the first user across multiple devices, multiple platforms, or a combination thereof; and
causing the experience to be delivered to the firsts user via a graphical user interface on the second device, such that the first user continues to receive the experience after switching from the first device to the second device.

12. The system of claim 11, wherein the operations further comprise:
creating one or more cohorts based on at least one of event properties or user properties; and
segmenting the plurality of users based on at least one cohort of the one or more cohorts, wherein the at least one cohort includes the first cohort and a second cohort.

13. The system of claim 12, wherein the operations further comprise:
determining an experience variant of the product to be delivered to users of the second cohort;
identifying another user belonging to the second cohort based on at least one of user behaviors or user properties associated with the other user included in the user data; and
causing the experience variant to be delivered to the other user.

14. The system of claim 12, wherein the event properties include at least one of a count, a relative count, a total sum of a property, distinct values of a property, or a historical count of user interactions with the product.

15. The system of claim 12, wherein the user properties include at least one user demographic data and user device data, wherein the user device data includes at least a type of a device, a type of an operating system installed on the device, a location of the device.

16. The system of claim 11, wherein the operations further comprise estimating a number of users impacted by the experience based on an experiment evaluation analysis using historical analytics.

17. The system of claim 11, wherein the operations further comprise:
causing the experience of the product to be delivered to a group of users of the plurality of users, the group of users including the first user;
tracking an exposure of the group of users to the experience; and
determining, from the group of users, users to be included in an experiment evaluation analysis based on the exposure tracking.

18. The system of claim 11, wherein the operations further comprise performing client-side software development kit (SDK) integration between experiment SDKs and analytics SDKs.

19. The system of claim 11, wherein the unique internal identifier links the first user to the user ID, a device ID for the first device, and a device ID for the second device.

20. A non-transitory computer-readable medium having with instructions stored thereon that, responsive to execution by a processing device to perform operations to deliver data-driven experiences of a computer-rendered product, the operations comprising:
receiving user data associated with a plurality of users using the product, the product comprising at least one of a website or an application;
identify, from the plurality of users, a first user belonging to a first cohort based on at least one of user behaviors or user properties associated with the first user included in the user data;
causing an experience of the product to be delivered to the first user via a graphical user interface on a first device;
performing an identity resolution to determine that the first user has switched from the first device to a second device, wherein the identity resolution is performed by deriving a unique internal identifier for the first user based on a user ID and a device ID associated with the first user, the unique internal identifier being derived by:
in response to the user ID being known and being mapped to a first internal identifier, choosing the unique internal identifier to be the first internal identifier;
in response to the user ID being known and not being mapped to an internal identifier, but the device ID being known and being mapped to a second internal identifier, determining if the second internal identifier is associated with a user ID associated with a second user, and in response to the second internal identifier being determined to not be associated with a user ID associated with a second user, choosing the unique internal identifier to be the second internal identifier;
in response to the second internal identifier being determined to be associated with the user ID associated with the second user, discarding the second internal identifier and creating a new internal ID as the unique internal identifier for the first user;
wherein if the first user accesses different devices with different device IDs, the user ID takes precedence when deriving the unique internal identifier;
wherein the unique internal identifier is derived so as to be consistent for the first user as the first user switches between different devices and platforms and ensures a consistent user experience to be delivered to the first user across multiple devices, multiple platforms, or a combination thereof; and
causing the experience to be delivered to the firsts user via a graphical user interface on the second device, such that the first user continues to receive the experience after switching from the first device to the second device.

* * * * *